United States Patent [19]

Mitchell

[11] 3,947,347
[45] Mar. 30, 1976

[54] PROCESS FOR REMOVING METALLIFEROUS CONTAMINANTS FROM HYDROCARBONS

[75] Inventor: David S. Mitchell, Novato, Calif.

[73] Assignee: Chevron Research Company, San Francisco, Calif.

[22] Filed: May 8, 1974

[21] Appl. No.: 467,975

Related U.S. Application Data

[63] Continuation of Ser. No. 295,027, Oct. 4, 1972, abandoned.

[52] U.S. Cl............................ 208/251 H; 208/309
[51] Int. Cl.$^2$........................................ C10G 25/00
[58] Field of Search ....... 208/309, 251 H, 253, 264, 208/211, 299, 89, 91, 310, 251

[56] References Cited
UNITED STATES PATENTS

| | | |
|---|---|---|
| 2,910,434 | 10/1959 | Hess et al. ........................ 208/251 |
| 3,073,777 | 1/1963 | Oettinger et al. ..................... 208/59 |
| 3,340,180 | 9/1967 | Beuther et al. ...................... 208/108 |
| 3,362,901 | 1/1968 | Szepe et al............................ 208/86 |
| 3,365,389 | 1/1968 | Spars et al. .......................... 208/59 |
| 3,530,066 | 9/1974 | Kuwata et al....................... 208/309 |
| 3,640,817 | 2/1972 | O'Hara ................................. 208/59 |
| 3,798,157 | 3/1974 | Manzanilla et al. ................ 208/309 |

*Primary Examiner*—Delbert E. Gantz
*Assistant Examiner*—James W. Hellwege
*Attorney, Agent, or Firm*—G. F. Magdeburger; R. H. Davies; D. L. Hagmann

[57] ABSTRACT

A process for removing metalliferous contaminants from a hydrocarbon feedstock is disclosed, comprising contacting the feedstock in the presence of hydrogen with a solid, said solid consisting essentially of an inert particulate solid having an average pore size in the range of from 1,000 to 10,000 A, preferably 5,000 to 7,000, and a surface area in the range of from 1 to 20 m$^2$/gram, preferably 2 to 10 m$^2$/gram.

4 Claims, No Drawings

3,947,347

PROCESS FOR REMOVING METALLIFEROUS CONTAMINANTS FROM HYDROCARBONS

This is a continuation of application Ser. No. 295,027, filed Oct. 4, 1972, now abandoned.

BACKGROUND OF THE INVENTION

1. Field of the Invention

It is well known that various metallic elements are found in petroleum crude oils. A list of those that may be present are set forth in U.S. Pat. No. 2,910,434. The most common are iron, nickel and vanadium. These metals, particularly iron, nickel and vanadium, are harmful when included in feedstocks used for further refining operations. For example, in hydrocracking operations the plating out of iron metals on the catalyst's exterior surfaces can over a time cause interstitial plugging of the catalyst bed. This limits the catalyst life in a hydrocracker since unacceptable pressure drops develop. Additionally, the metalliferous deposits serve to deactivate (poison) the catalyst requiring premature shutdown of the reactor and replacement of the catalyst. Conventional catalysts having surfaces areas typically ranging from 100 m$^2$/gram to as much as 400 m$^2$/gram and having relatively small pore diameters are quite active for removing metals from hydrocarbons. However, they are particularly susceptible to interstitial plugging as well as being economically unattractive for removal of metal contaminants. The process of the subject invention uses a catalyst which surprisingly combines low surface area and large pore size with effective removal of metal contaminants with reduced interstitial plugging of the catalyst bed.

2. Description of the Prior Art

U.S. Pat. NO. 2,910,434 teaches the removal of trace metals from a cat cracking feed by contacting the feed with hydrogen and an inert packing material.

U.S. Pat. No. 2,985,582 teaches the use of "large surface" materials which may be porous to pretreat feedstocks for removal of ash.

U.S. Pat. No. 3,073,777 teaches the removal of inorganics from crude oils by use of large surface materials.

U.S. Pat. No. 3,340,180 teaches the use of catlyst with pores ranging up to 300 A for hydrodesulfurization of a feed containing asphaltic and metalliferous compounds.

U.S. Pat. No. 3,530,066 teaches preliminarily treating the feedstock to the hydrotreating zone with a particulate solid having pores in the range of from 1,000 to 50,000 A containing a metal component and an alumina hydrogel to remove metals and asphaltenes.

U.S. Pat. No. 3,365,389 teaches the use of a guard bed of silica, alumina, etc., without a hydrogenation component.

U.S. Pat. No. 3,362,901 teaches removal of asphaltenes over an inert particulate support containing a Group VIII iron transition series metal or the use of the inert material alone.

U.S. Pat. No. 3,640,817 teaches the use of a catalyst wherein 50 percent of the pores have an average pore diameter of 1,000 A or greater effective for the removal of asphaltenes.

SUMMARY OF THE INVENTION

The subject invention is directed to a method for reducing interstitial plugging of catalyst beds by metal deposition. The process comprises contacting a metalliferous contaminated feedstock in the presence of hydrogen with an inert mterial having no cracking component, having an average pore diameter in the range of from 1,000 to 10,000 A and a surface area of from 1 to 20 m$^2$/gram. The inert support may also contain a hydrogenation component selected from the group consisting of Group VIB and Group VIII metals and compounds thereof.

A particularly preferred support is a diatomaceous earth having an average pore diameter of about 6,000 A and a surface area of about 4 m$^2$/gram.

DETAILED DESCRIPTION OF THE INVENTION

The process of the subject invention comprises contacting a metals contaminated hydrocarbon feedstock in the presence of hydrogen with an inert material having an average pore diameter in the range of from 1,000 to 10,000 A, preferably 5,000 to 7,000 A, and a surface area in the range of from 1 to 20 m$^2$/gram, preferably 2 to 5 m$^2$/gram. By the process of the subject invention, metal contaminants, particularly iron, are removed from the feedstock alleviating interstitial plugging of catalyst beds by metal deposition. It has been discovered that by the use of an inert support having no active cracking component and which may optionally contain a hydrogenating component selected from the class consisting of Group VIB and Group VIII metals and compounds thereof, the metal contaminants in the feedstock are deposited primarily inside the pores of the catalyst and not on the exterior surface of the catalyst as has been the case with many prior art catalysts. As a result, interstitial plugging of the catalyst bed (the closing off of the interstices between adjacent catalyst particles, is greatly alleviated resulting in longer onstream time (pressure buildup occurs less rapidly), less catalyst poisoning, and resulting improved economics. Using the process of the subject invention at least 50 percent by weight of the metal removed is deposited in the pores of the catalyst, and preferably at least 60 percent. By deposited in the pores is meant that the metal is deposited or laid down on the portion of the internal part of the catalyst such that no contribution to the interstitial plugging of the catalyst bed can be attributed to the metal so deposited.

Support Materials

The inert support materials which may be used in the process of the subject invention are characterized by having an average pore diameter of 1,000 to 10,000 A, preferably 5,000 to 7,000 A, surface areas of from 1 to 20 m$^2$/gram, preferably 2 to 10 m$^2$/gram, and no active cracking component. Suitable materials include alundum, a fused alumina refractory product of the Norton Company, diatomaceous earths which have been treated by firing at high temperatures and the like. Particularly desirable are Celite 408 and Celite 410, products of Johns-Manville. Celite 408 is a diatomaceous silica in the form of extruded pellets, 0.175 inch in diameter and 0.156 inch long, having a surface area in the range of from 2 to 10 m$^2$/gram, an average pore diameter of approximately 6,000 A, and a compressive strength of 5,200 psi. Celite 410 is similar to Celite 408 but has a length of 0.275 inch, a diameter of 0.25 inch and a compressive strength of 2,200 psi. Both materials are slightly acid to neutral.

Hydrogenating Components

The inert material used to treat metals contaminated hydrocarbon feedstock may be composited with a hydrogenating component if desired. The hydrogenating component increases the ability of the inert material to remove metal contaminant from the feedstock. However, operating efficiency and economics may weigh in favor of using the inert material without any hydrogenating component and the subject invention encompasses the use of both types of materials. If a hydrogenating component is present, it will be selected from the class consisting of Group VIB and Group VIII metals. When the term "metal" is used herein to describe the catalyst prepared by the method of the present invention, it is understood that the metal or metal component may exist in the final catalyst as the metal, as an inorganic compound thereof, or as a mixture of the metal and an inorganic compound or compounds thereof. Thus, the metal may exist as the oxide, chloride, sulfide, or the like.

The hydrogenating component when present in the support materials will constitute from about 1 to 30% by weight, preferably about 4 to 10% based on the total weight of the composite.

Particularly preferred is the use of an inert support together with a cobalt-molybdenum hydrogenating component.

Conventional techniques for introducing hydrogenating components onto a support such as impregnation, cogelation, etc., may be used in preparing the catalyst of this invention.

Reaction Condition

The contacting of the hydrocarbon feedstock containing metal contaminants with (1) the inert support with or without a hydrogenating component(s) and (2) hydrogen can be carried out at a temperature in the range of 500° to 850°F and a pressure of from 300 to 3,000 psig. A liquid hourly space velocity in the range from 0.2 to 10, preferably 4 to 6, will be used. The hydrogen supply rate makeup and recycle hydrogen to the metals removal zone will be in the range from about 500 to about 10,000 standard cubic feet per barrel, preferably about 2,000 to 5,000 standard cubic feet per barrel.

Feedstocks

Metal contaminated feedstocks which may be treated by the process of the subject invention include petroleum crude oils, topped or reduced crude oils, solvent deasphalted oils, distillates, heavy cycle stocks, visbreaker liquid effluent, atmospheric and vacuum crude tower bottoms, shale oils, coal tars, tar sand oils, etc.

Examples

In order that the invention may be better understood, the following examples will serve to further illustrate the invention.

Various catalysts (composition and properties of which are shown in Table I) were placed in wire mesh canisters and placed in the front end of a hydrocracking unit. The canisters each contained 210 ml of catalyst and were made of wire mesh so that the hydrocarbon feedstock and hydrogen flowed freely through them. In Examples 2 and 4 the Co and Mo were introduced onto the supports by impregnation with a water soluble salt of the metals.

TABLE I

| Example | Comparison of Catalyst Properties | | | |
|---|---|---|---|---|
| | 1 | 2 | 3 | 4 |
| | Prior Art Catalysts | | Catalysts of this Invention | |
| Support | Alumina | Alumina | Celite 410 | Celite 410 |
| Co, wt. % | 0 | 0.9 | 0 | 0.8 |
| Mo, wt. % | 0 | 3.3 | 0 | 3.3 |
| Surface Area, m²/g | ~200 | 193 | ~4 | ~4 |
| Pore Volume, ml/g | 0.3 | 0.31 | 0.62 | 0.57 |
| Pore Diameter, A | 60 | 64 | 6200 | 5700 |
| Crush Strength, lb | — | 61 | 79 | 63 |
| Attrition, wt. % | — | 4.1 | 3.7 | 3.2 |

The canisters remained in the hydrocracking reactor for a period of about 4-½ months. At the end of this period samples were removed and analyzed for metals content, particularly iron (the feedstock utilized during the run had the average composition shown in Table II).

TABLE II

| | |
|---|---|
| Feedstock Iron Content (ppm) | 8.8 |
| Temperature (°F) | 750–800 |
| Pressure (psig) | 2,700 |
| Reactor LHSV (Vol. Feed/Vol. Cat. Hr.) | 0.8 |
| Hydrogen Flow Rate (SCF/Bbl.) | 4,000 |

Table III shows the results obtained using the prior art catalysts and the catalysts of the subject invention described in Table I above.

TABLE III

| | Iron Removed by Catalysts in 210 cc. Canister Charges (¼" Catalyst) | | | |
|---|---|---|---|---|
| Example | 1 | 2 | 3 | 4 |
| | Prior Art Catalyst | | New High Pore Diameter Catalyst | |
| Total Iron Removed, G. | 6.3 | 8.3 | 6.9 | 9.1 |
| % Iron Inside Catalyst | | | | |
| Total Iron Removed | 36.5 | 56.5 | 80 | 59 |

While the process of the subject invention may be carried out in a separate reaction zone, it is preferred that the inert particulate support solid, with or without a hydrogenating component, be used in the first part of a hydrocracking reactor. In this manner the inert particulate solid acts as a guard bed and alleviates catalyst poisoning as well as preventing premature reactor shutdown due to interstitial plugging and unacceptable pressure levels.

It is apparent that many widely different embodiments of the subject invention may be made without departing from the scope and spirit thereof; and, therefore, it is not intended to be limited except as indicated in the appended claims.

What is claimed is:

1. A process for removing metalliferous contaminants from a hydrocarbon feedstock comprising contacting said feedstock in the presence of hydrogen with a solid, said solid consisting essentially of inert particulate support material containing pores, and having a surface area in the range of from 1 to 20 m²/gram, said pores having an average pore diameter in the range of from 1,000 to 10,000 A, and said solid being disposed as a bed of contact material and being without any hydrogenating component, said contacting being (1) at a temperature in the range of 500° to 850°F., (2) at a pressure of from 300 to 3,000 psig and (3) a liquid hourly space velocity in the range from 0.2 to 10, and said feedstock being selected from the group consisting of metal contaminated petroleum crude oils, topped or reduced crude oils, solvent deasphalted oils, distillates, heavy cycle stocks, visbreaker liquid effluent, atmospheric and vacuum crude tower bottoms, shale oils, coal tars, and tar sand oils.

2. The process of claim 1 wherein the pore diameter is in the range of from 5,000 to 7,000 A.

3. The process of claim 1 wherein the surface area is in the range of from 2 to 10 m²/gram.

4. The process of claim 1 wherein said solid is selected from the group consisting of diatomaceous earth and fused alumina.

* * * * *